Dec. 15, 1959     E. J. SAVILLE     2,917,072
RELIEF VALVE
Filed June 4, 1956
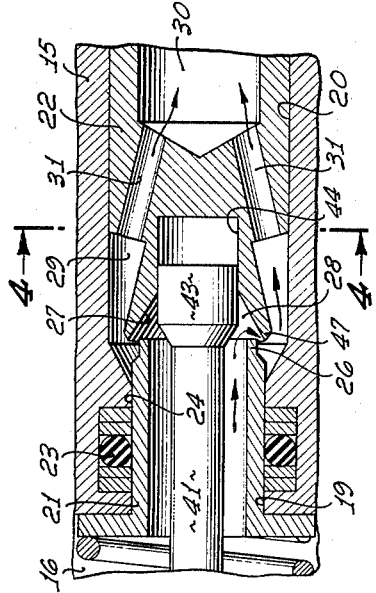
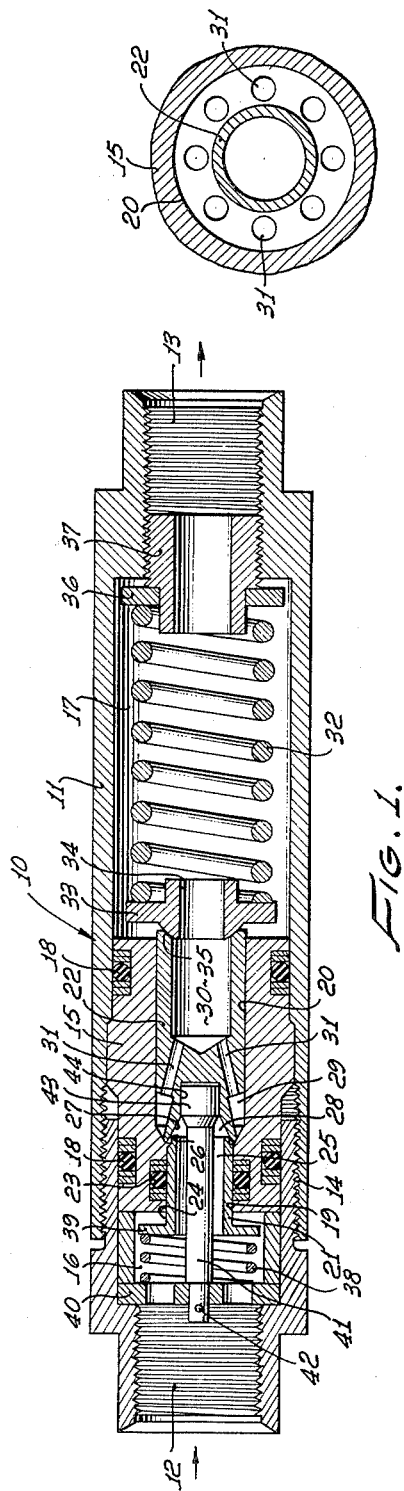
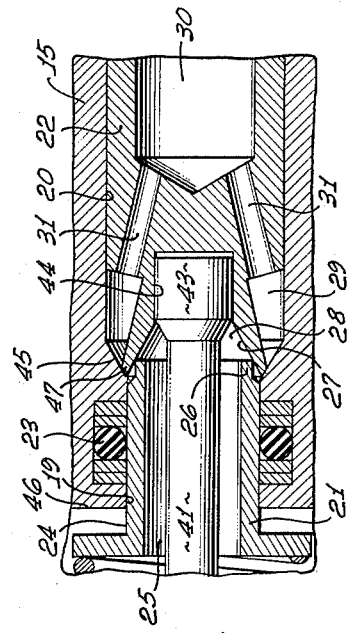
*Eric J. Saville*
INVENTOR.

United States Patent Office 2,917,072
Patented Dec. 15, 1959

2,917,072

RELIEF VALVE

Eric J. Saville, Claremont, Calif., assignor of one-half to Raymond S. Hunt, Jr., Pomona, Calif.

Application June 4, 1956, Serial No. 589,208

7 Claims. (Cl. 137—469)

This invention relates to valves and is particularly directed to improvements in a relief valve for use in hydraulic circuits. Valves of this general type are used to limit maximum pressure in a conduit or chamber by relieving pressure from the conduit or chamber to atmosphere or to a lower pressure system, at a predetermined and adjustable pressure level or intensity. Such valves open at the predetermined pressure intensity and serve to prevent further increase in pressure in the conduit or chamber within the limits of flow capacity of the valve.

Should the pressure in the conduit or chamber decrease below a predetermined intensity, the relief valves closes.

It is an object of this invention to provide a relief valve of this general type which cracks open at the desired pressure intensity and which moves to fully open position to carry full rated flow at a pressure level only slightly higher. The "spread" between the pressure at which initial cracking open occurs and the pressure at which full rated flow occurs is thus kept at a minimum. It is an object of the present invention to provide a relief valve wherein the sealing force increases proportionately with increased inlet pressure until the valve opens. It is an object of this invention to provide a relief valve in which the opening force on the poppet element increases proportionately with inlet pressure after the valve opens. Another general object is to provide a relief valve of this type which does not chatter under any conditions of pressure and flow values within the range of operation.

I accomplish these general objects by providing a valve construction having a floating seat which cooperates in a novel manner with an axially movable poppet valve element so that the seat and poppet move initially as a unit under increasing pressure conditions until the predetermined "cracking" pressure is reached. The floating seat and poppet then separate to permit flow to occur through the relief valve assembly. Other features contributing to the general characteristics described above are achieved by providing a novel form of poppet valve element having a frustro-conical wall defining a concave recess, the wall cooperating with a circular edge on the floating seat to form a seal. The concave form of the recess produces a reversal in the path of flow of hydraulic fluid and this, in turn, produces an effective force on the poppet valve element assisting the poppet to open against the force of the relief valve spring. Furthermore, the seat area or effective center of pressure increases with poppet lift as a geometrical function, due to the concave shape of the sealing element on the poppet in relation to the sealing edge of the seat.

An expansion chamber is provided immediately downstream from the cooperating sealing parts of the seat and poppet and a plurality of orifices are provided in the poppet to carry hydraulic fluid from this expansion member into the outlet chamber of the relief valve assembly.

The size and number of these orifices are selected to provide the desired quantity of flow for which the valve assembly is rated. The flow passing through these orifices creates a pressure drop from the expansion chamber to the outlet chamber of the relief valve. The higher pressure in the expansion chamber then acts on the total diameter of the poppet to provide a further substantial force to open the poppet against the relief valve spring. Further, the concave surface on the poppet valve together with the expansion chamber and the pressure maintained therein by the orifices substantially eliminate cavitation and unstable flow characteristics and thereby prevent valve chatter commonly associated with conventional relief valve devices.

Another feature of my invention involves the use of a novel form of dash-pot mechanism which dampens movement of the poppet valve element when the valve assembly is subjected to fluctuations in pressure originating in the pressure source. Other and more detailed objects and advantages will appear hereinafter.

In the drawings:

Figure 1 is a sectional view showing a preferred embodiment of my invention.

Figure 2 shows a portion of Figure 1 on an enlarged scale.

Figure 3 is a view similar to Figure 2 showing the valve parts in open position.

Figure 4 is a transverse sectional view taken substantially on the lines 4—4 as shown on Figure 3.

Referring to the drawings, the valve assembly generally designated 10 includes a housing 11 having an inlet connection 12 and an outlet connection 13. The housing 11 may be formed in two parts for purposes of manufacture and assembly and these parts may be connected by threads 14. A stationary sleeve member 15 is positioned within the housing. The sleeve member 15 and housing 11 cooperate to define an inlet chamber 16 and an outlet chamber 17.

The sleeve member 15 is sealed with respect to the housing by means of the axially spaced sealing devices 18 and this sleeve member is provided with coaxial communicating bores 19 and 20.

A tubular seat element 21 is slidably mounted within the bore 19 and a poppet valve element 22 is slidably mounted within the bore 20. A seal ring assembly 23 carried by the sleeve member 15 engages the outer cylindrical surface 24 of the floating seat 21. The seat is provided with a central axially extending opening 25. The annular wall of the tubular seat 21 may be reduced in thickness at its forward end to provide a circular edge 26. This edge 26 engages the frustro-conical wall 27 on the poppet valve element 22 to form a seal. The wall 27 defines the concave recess 28.

The outer surface of the poppet valve element 22 is cut away near the forward end thereof to define the expansion chamber 29 within the bore 20 of the member 15. This expansion chamber 29 communicates with the central opening 30 within the poppet valve element 22 by means of the orifices 31. A flared skirt portion 47 is defined between concave recess 28 and expansion chamber 29.

A relatively heavy spring 32 is mounted within the outlet chamber 17 within the housing 11. One end of this spring rests against the thrust fitting 33 which has a central opening 34 therein. The fitting 33 contacts the downstream end of the poppet element 22 by means of the self-aligning ball joint 35. The other end of the spring engages the thrust washer 36 carried on the hollow adjusting screw 37. A hexagonal bore (not shown) is provided through adjusting screw 37 for turning the adjusting screw 37 to control the force of the spring 32.

A relatively light spring 38 is mounted in the inlet chamber 16 and one end of this spring engages the flange 39 provided on the inlet end of the floating seat 21. The other end of the spring 38 engages the stationary apertured washer 40. The spring 38 acts on the floating seat 21 to maintain the sealing edge 26 in engagement with the concave wall 27 on the poppet element 22.

An axially extending post 41 is fixed to the apertured washer 40 by means of pin 42 and this post projects through the central opening 25 in the floating seat element 21. The post is enlarged at its projecting end to provide a plunger 43 and the cylindrical recess 44 is relatively small with the result that a dash-pot action is achieved to prevent rapid motion of the poppet element 22 with respect to the stationary plunger 43 and post 41.

In operation, pressure fluid admitted through the inlet connection 12 passes through openings in the apertured washer 40 and into the inlet chamber 16. The valve parts remain in position shown in Figure 2 so long as the intensity of the pressure in the inlet chamber 16 remains below the predetermined value as adjusted by means of screw 37. The force of the spring 32 holds the poppet valve element 22 against the tapered shoulder 45 which connects the bores 19 and 20 within the member 15. Pressure within the chamber 16, supplemented by the force of the spring 38, holds the sealing edge 26 of the floating seat 21 in sealing engagement with the frustro-conical wall 27 of the poppet valve 22.

Increasing pressure within the inlet chamber 16 causes the floating seat 21 and poppet 22 to move as a unit from left to right as viewed in the drawings. The sealing parts 26 and 27 remain in contact. As the pressure continues to increase, the sealing force between the floating seat 21 and the poppet 22 increases proportionately. The sealing force is proportional to the pressure because the pressure acts upon an unbalanced net annular area comprising the difference between the cross-sectional area of the tubular portion of seat 21 and the transverse area of the reduced end portion of seat 21 within sealing edge 26. This net area is therefore equal to the annulus formed between sealing edge 26 and base 19. Movement of the floating seat 21 from left to right is arrested by contact of the flange 39 with the end surface 46 on the stationary sleeve member 15. Further increase in pressure within the chamber 16 causes the sealing elements of the valve assembly to "crack" and the poppet valve element 22 to move from left to right, separating the sealing edge 26 from the wall 27. Hydraulic fluid then passes in the direction of the arrows indicating flow path in Figure 3. The hydraulic fluid reverses its direction of travel as it passes around the rim of flared skirt portion 47 to reach the expansion chamber 29. The hydraulic fluid then passes through orifices 31 and opening 30 into the outlet chamber 17.

The valve parts remain in the open position shown in Figure 3 until such time as the pressure within the inlet chamber 16 falls to a predetermined value. The spring 32 then moves the poppet valve element 22 to the left to reengage the surface 27 with the sealing edge 26 and this causes the sealing elements of the valve to "reseat," (close). A further decrease in pressure causes the poppet valve element 22 and floating seat element 21 as a unit to move from right to left. The parts return to the original position shown in Figure 2.

The floating seat feature permits increased sealing forces between the edge 26 and the wall 27 with increased pressure intensities within the inlet chamber 16 up to any desired pressure intensity immediately prior to the "crack" or pop-off, whereas potential leakage across the sealing parts increases with increasing pressure in conventional valve designs. Such is not the case in my invention where leakage decreases with increased inlet pressure because the sealing forces increase proportionately with increased inlet pressure. The sealing pressures increase to a maximum immediately prior to crack or pop-off intensity.

The inverse poppet angle defined by the concave wall 27 provides increased effective seat area (increased center of pressure) with increased poppet travel or lift, as the flow rate increases. The seat area or effective center of pressure increases with poppet lift as a geometrical function due to the concave recess 28 in relation to sealing edge 26. Reversal of flow path, best shown in Figure 3, the dynamic flow velocity resulting therefrom and the pressure drop created by orifices 31 produces an effective force on the poppet to open against the force of the spring 32. The net result is that the poppet has a greater axial force imposed upon it due to the effective increase in the center of pressure. Therefore, allowing the inlet pressure to act on a larger area, and a secondary force increases due to the 180° reversal in flow reduction and in addition the force created by the pressure drop across orifices 31, thereby causing the poppet to open against the force of the spring 32, with only a nominal increase in pressure in chamber 16 greater than the static pressure preset pop-off pressure.

The dash-pot parts 43 and 44 effectively prevent unstable action of the poppet 22 under influences of rapid pressure fluctuations in the inlet chamber 16. With normal increase or decrease in the inlet pressure the poppet responds promptly by displacing fluid into or out of the dash-pot recess through the clearance space between the plunger 43 and recess 44.

Having fully described my invention, it is to be understood that I do not wish to be limited to the details herein set forth, but my invention is of the full scope of the appended claims.

I claim:

1. In a valve assembly, the combination of: a stationary housing having an inlet chamber and an outlet chamber, a stationary member within the housing between the chambers, the member having first and second co-axial communicating bores of differing diameters, a tubular seat element slidably mounted in one of said bores and extending into the inlet chamber, a poppet element slidably mounted in the other of said bores and extending into the outlet chamber, the seat element having a circular edge at one end, the poppet element having a frustro-conical wall defining a concave recessed surface, the recessed surface engaging said circular edge to form a seal between the seat element and the poppet element, the recessed surface extending radially and axially from said seal, whereby an increased area of said wall is exposed to pressure upon separation of the elements, said seat element having an unbalanced area exposed to inlet pressure when said seal is formed, a spring acting to resist axial movement of the poppet element in a direction away from the inlet chamber, and stop means limiting the extent of axial movement of the seat element in said direction, whereby increasing pressure within the inlet chamber serves to move the tubular seat element and poppet element axially as a unit against the action of the spring, and to effect separation of the circular edge and frustro-conical wall to eliminate said seal and expose said increased area of said wall to pressure by continuing to move the poppet element after movement of the seat element is arrested by the stop means.

2. In a valve assembly, the combination of: a stationary housing having an upstream inlet chamber and a downstream outlet chamber, a tubular seat element having an unbalanced area exposed to inlet pressure, a coaxial poppet element, means slidably mounting each of said elements for coaxial movement within the housing, the seat element having a circular edge at its downstream end, the poppet element having a flaring skirt portion defining a concave recessed surface in the upstream end of said poppet element, said skirt portion recessed surface engaging said circular edge to form a seal between the seat element and the poppet element, the recessed surface extending radially and axially from said seal, whereby an increased area of said skirt portion is exposed to pressure upon separation of the seat and poppet elements, said seat element having an unbalanced area exposed to inlet pressure when said seal is formed, passage means on the poppet element for conveying hydraulic fluid from the outer portion of said skirt portion to the outlet chamber, resilient means acting to resist axial movement of the poppet element in the direction of flow, and stop means limiting the extent of axial movement of the seat element in said direction, whereby increasing pressure within the inlet chamber serves to move the said elements axially as a unit against the action of the resilient means, and to effect said separation of the seat element circular edge and said skirt portion to eliminate said seal and expose said increased area of said skirt portion to pressure by continuing to move the poppet element after movement of the seat element is arrested by the stop means, to permit flow around said skirt portion.

3. In a valve assembly, the combination of: a stationary housing having an inlet chamber and an outlet chamber, a stationary member within the housing between the chambers, the member having first and second coaxial communicating bores, a tubular seat element having an unbalanced area exposed to inlet pressure slidably mounted in one of said bores and extending into the inlet chamber, a poppet element slidably mounted in the other of said bores and extending into the outlet chamber, a downstream sealing edge on said seat element, a flaring skirt portion on the upstream end of said poppet element, said skirt portion having a recessed surface for engaging said seat element sealing edge, the skirt portion extending radially outward from said engagement with the seat element sealing edge, resilient means acting to resist axial downstream movement of the poppet element, and stop means limiting the extent of axial movement of the seat element in said direction, whereby increasing pressure within the inlet chamber serves to move the tubular seat element and poppet axially as a unit against the action of the resilient means, and to effect separation of the said sealing parts and increase of poppet area exposed to pressure by continuing to move the poppet element after movement of the seat element is arrested by the stop means, to permit flow around said skirt portion.

4. In a valve assembly, the combination of: a stationary housing having an inlet chamber and an outlet chamber, a stationary member within the housing between the chambers and having first and second connected bores, said first bore being smaller than the second bore, a slidable tubular seat element disposed within the first bore and having an unbalanced area exposed to inlet pressure, a poppet element slidably mounted in the second bore and extending into the outlet chamber, cooperating sealing parts on said elements for forming a seal to prevent flow from the inlet chamber to the outlet chamber, the poppet element having a flaring skirt portion extending radially outward from the location of said seal and axially therefrom, whereby an increased area of the poppet element is exposed to pressure upon separation of said elements to disengage said seal, said seat element having an unbalanced area exposed to inlet pressure when said seal is formed, the flaring skirt portion cooperating with said second bore to define an expansion chamber, the poppet element having orifices establishing communication between the expansion chamber and the outlet chamber, resilient means acting to resist axial movement of the poppet element in a direction away from the inlet chamber, whereby increasing pressure within the inlet chamber serves to move the poppet element axially as a unit in said direction against the action of the resilient means and to effect separation of the said sealing parts, thereby increasing the area of said poppet exposed to said pressure and permitting flow around the skirt portion into the expansion chamber and into the outlet chamber.

5. In a valve assembly, the combination of: a stationary housing having an inlet chamber and an outlet chamber, a stationary member within the housing between the chambers and having first and second connected bores, said first bore being smaller than the second bore, a tubular seat element within the first bore and having an unbalanced area exposed to inlet pressure, a poppet element slidably mounted in the second bore and extending into the outlet chamber, the poppet element having a flared skirt portion at its upstream end, said skirt portion cooperating with said bore to define an expansion chamber, the skirt portion defining a concave recess in said upstream end of the poppet element, said recess having a frustro-conical surface engageable with the seat element to form a seal to prevent flow from the inlet chamber to the outlet chamber, said surface extending radially outward from said seal and axially therefrom, whereby an increased area of the poppet element is exposed to pressure upon separation of said poppet and seat elements to disengage said seal, said seat element having an unbalanced area exposed to inlet pressure when said seal is formed, the poppet element having orifices establishing communication between the expansion chamber and the outlet chamber, resilient means acting to resist axial movement of the poppet element in a direction away from the inlet chamber, whereby increasing pressure within the inlet chamber serves to move the poppet element axially in said direction against the action of the resilient means, and to effect separation of the poppet element and seat element to expose said increased area of the poppet element exposed to said pressure and permitting flow around the skirt portion into the expansion chamber and into the outlet chamber.

6. A valve assembly comprising a housing having an upstream inlet chamber and a downstream outlet chamber, means defining first and second co-axial communicating bores in said housing, a co-axial poppet element slidably mounted in said second bore, a flared skirt portion on the upstream end of said poppet element, said skirt portion cooperating with said bore to define an expansion chamber, said skirt portion having a frusto-conical interior surface defining a concave recess, a tubular seat element slidably mounted in said first bore, said seat element having a reduced downstream end portion adapted for cooperation with said interior surface to provide a pressure seal, said skirt portion interior surface extending radially outward from said seal and axially therefrom, said reduced end portion of the seat element providing a net unbalanced area whereby said seat element is urged against said interior surface with a sealing force proportional to pressure within said inlet chamber, resilient means urging said poppet element against axial movement in the direction of flow, and stop means limiting the extent of axial movement of said seat element in said direction, whereby increasing pressure within said inlet chamber moves said elements axially as a unit against the urging of said resilient means, and effects separation of said sealing parts by continuing to move the poppet element after movement of the seat element is arrested by the stop means, thereby disengaging said seal and exposing the increased area of said skirt portion interior surface to pressure.

7. A valve assembly comprising a cylindrical housing having an upstream inlet chamber and a downstream outlet chamber, a sleeve member within said housing, said sleeve defining first and second co-axial communicating bores, the first bore being of smaller diameter than the second bore and being upstream relative thereto, a co-axial poppet element slidably mounted in said second bore, a flared skirt portion on the upstream end of said poppet element, said skirt portion cooperating with said bore to define an expansion chamber, said skirt portion having a frustro-conical interior surface defining a concave recess, a tubular seat element slidably mounted in said first bore, said seat element having a reduced downstream end portion adapted for cooperation of its peripheral edge with said interior surface to provide a pressure seal, said skirt portion interior surface extending radially outward from said seal and axially therefrom, said reduced end portion of the seat element providing a net unbalanced area whereby said seat element is urged against said interior surface with a sealing force proportional to pressure within said inlet chamber, said net area being equivalent to the annular area between said peripheral edge and said second bore, means defining orifices communicating between said expansion chamber and the outlet chamber for producing a pressure differential to urge said poppet element from said seat element with a force proportional to said pressure in the inlet chamber, spring means acting to resist axial movement of the poppet element in the direction of flow, means including a stationary part extending through the tubular seat element and cooperating with the poppet element to provide a dash-pot action, and stop means limiting the extent of axial movement of the seat element in said direction, whereby increasing pressure within the inlet chamber serves to move said elements axially as a unit against the action of the resilient means, and to effect separation of said sealing parts by continuing to move the poppet element after movement of the seat element is arrested by the stop means, thereby disengaging said seal and exposing the increased area of said skirt portion interior surface to pressure.

References Cited in the file of this patent

UNITED STATES PATENTS

| | | |
|---|---|---|
| 2,080,824 | Kane | May 18, 1937 |
| 2,320,339 | Buttner | June 1, 1943 |
| 2,591,528 | Filstrup | Apr. 1, 1952 |
| 2,622,613 | McNeal | Dec. 23, 1952 |

FOREIGN PATENTS

| | | |
|---|---|---|
| 5,946 | Great Britain | May 14, 1885 |
| 925,168 | France | Mar. 24, 1947 |
| 633,005 | Great Britain | Dec. 5, 1949 |